(12) United States Patent
Lyons et al.

(10) Patent No.: US 7,618,609 B2
(45) Date of Patent: Nov. 17, 2009

(54) METHOD TO PREPARE DEFECTIVE METAL OXIDES WITH INCREASED SPECIFIC CAPACITY

(75) Inventors: Karen Swider Lyons, Arlington, VA (US); Debra R. Rolison, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/046,295

(22) Filed: Jan. 16, 2002

(65) Prior Publication Data

US 2003/0133867 A1    Jul. 17, 2003

(51) Int. Cl.
  *C01B 13/00* (2006.01)
(52) U.S. Cl. .................. 423/594.17; 423/605; 423/632; 423/594.19
(58) Field of Classification Search .................. 423/594, 423/17, 632, 633, 634, 594.19, 605, 594.17
  See application file for complete search history.

(56) References Cited

U.S. PATENT DOCUMENTS

| | | | | |
|---|---|---|---|---|
| 3,607,005 A | * | 9/1971 | Chambers | 423/62 |
| 3,607,752 A | * | 9/1971 | Graenicher | 117/19 |
| 3,704,181 A | * | 11/1972 | Nishihara et al. | 428/472.2 |
| 4,119,707 A | * | 10/1978 | Thome et al. | 423/594.17 |
| 5,160,712 A | * | 11/1992 | Thackeray et al. | 423/138 |
| 5,453,261 A | * | 9/1995 | Saidi et al. | 423/594.17 |
| 5,576,120 A | * | 11/1996 | Saidi | 429/231.2 |
| 5,811,068 A | * | 9/1998 | Takatori et al. | 423/263 |
| 5,897,945 A | * | 4/1999 | Lieber et al. | 428/323 |
| 5,910,382 A | | 6/1999 | Goodenough et al. | |
| 5,922,491 A | * | 7/1999 | Ikawa et al. | 358/1.15 |
| 6,066,413 A | | 5/2000 | Aymard et al. | |
| 6,087,043 A | | 7/2000 | Tossici et al. | |
| 6,139,986 A | | 10/2000 | Kurokawa et al. | |
| 6,159,637 A | * | 12/2000 | Shizuka et al. | 429/224 |
| 6,162,530 A | * | 12/2000 | Xiao et al. | 428/292.1 |
| 6,190,800 B1 | | 2/2001 | Iltchev et al. | |
| 6,210,835 B1 | | 4/2001 | Arai | |
| 6,248,477 B1 | * | 6/2001 | Howard et al. | 429/224 |
| 6,316,144 B1 | | 11/2001 | Xue et al. | |
| 6,794,297 B2 | | 9/2004 | Noda | |
| 6,860,780 B2 | | 3/2005 | Miyashita | |
| 7,049,232 B2 | | 5/2006 | Lee | |

FOREIGN PATENT DOCUMENTS

EP            0468942     *   1/1992

OTHER PUBLICATIONS

Chemical Principles, 4th edition, Masterton, et al., 1977, no month, p. 404.*

Jak, et al., Solid State Chemistry 1999, "Defect Structure of Li-Doped BPO4: A Nanostructured Ceramic Electrolyte for Li-Ion Batteries"., 142,74-79.

Ruetschi, Paul, Electrochemical Society.,"Influence of Crystal Structure and Interparticle Contact on the Capacity of $PBO^2$ Electrodes".,139, 1347-1351, May 1992.

Ruetschi, et al., Electrochemical Society., "Cation Vacancies in $MNO^2$ and Their Influence on Electrochemical Reactivity"., 135, 2663-2669, Nov. 1988.

Ruetschi, Paul, Electrochemical Society.,"Influence of Cation Vacancies on the Electrode Potential of $MNO^{2}$"., 135, 2657-2662, Nov. 1988.

Solid State Ionics 1992,"Electrochemical and Structural Characteristics of Some Lithium Intercalation Materials Synthesized Via a Sol-Gel Process: $V^2O5$ and Manganese Dioxides-Based Compounds"., 53-56, 701-709, Pereira-Ramos, et al.

Owens, Boone Electrochimica Acta 1999.,"Lithium Ion Insertion in Porous Metal Oxides"., 45, 215-224.

Passerini, et al., Solid State Ionics 1996,"XAS and Electrochemical Characterization of Lithium Intercalated $V^2O5$ Xerogels"., 90, 5-14.

Livage, J., Chemical Mater 1991.,"Vanadium Pentoxide Gels"., 3, 578-593.

Electrochemical Society 1999.,"In Situ X-Ray Absorption Spectroscopy Characterization of $V^2O5$ Xerogel Cathodes Upon Lithium Intercalation".,146, 2387-2392, Giorgetti, et al.

Salloux, et al., Electrochemical Society Oct. 1995., "Lithium Intercalation in Vanadium Pentoxide Aerogels"., 142, 191.

Le, et al. Electrochemical Society Jul. 1996.,"High Surface Area $V^2O5$ Aerogel Intercalation Electrodes"., 143, 2099-2104.

Passerini, et al., Solid State Ionics 1997,"XAS and Electrochemical Characterization of Lithiated High Surface Area $V^2O5$ Aerogels"., 104, 195-204.

Ruetschi, Paul, Dec. 1984, Electrochemical Society.,"Cation-Vacancy Model for $MnO2$".,131.

DOE Hydrogen program FY 2004 Progress Report: section IX, "Acronyms and Abbreviation" available online at http://www.hydrogen.energy.gov/pdfs/progress04/ix_acronym_list.pdf; p. 840.

Advanced Specialty Gas Equipment. General Purity http://www.asge-online.com/pdf/General_Purity.pdf and "Abbreviations and Symbols" http://www.asge-online.com/pdf/ASGEpg186.pdf.

Bowman Industry; "Flow Rate Selection Page", available online at http://www.bowmanindustry/com/flowrateselection.html.

Swider-Lyons. Improved lithium capacity of defective V2O5 materials, Solid State Ionics 152-153, (Accepted Feb. 14, 2002), 99-104.

* cited by examiner

*Primary Examiner*—Steven Bos
(74) *Attorney, Agent, or Firm*—John J Karasek; Amy Ressing

(57) ABSTRACT

Increased lithium capacity of defective oxide materials and methods for preparation are described herein. Point defects may be introduced into a metal oxide to increase its lithium ion capacity. Defective metal oxides can be prepared by heating the metal oxide under $O_2/H_2O$ at elevated temperatures. These increased lithium capacity metal oxides may be suitable for use as high specific energy cathodes in lithium metal and lithium ion batteries.

9 Claims, 3 Drawing Sheets

| Sample | Description | Capacity (mA·h/g) @ 20 µA/mg (± 4%) | OCP (V) vs Li ±0.001 |
|---|---|---|---|
| (a) | As received | 172 | 3.390 |
| (b) | $O_2$ annealed | 129 | 3.455 |
| (c) | $O_2/H_2O$ annealed | 212 | 3.439 |
| (d) | Ar annealed | 158 | 3.455 |
| (e) | $Ar/H_2O$ annealed | 72 | 3.395 |

Figure 3

METHOD TO PREPARE DEFECTIVE METAL OXIDES WITH INCREASED SPECIFIC CAPACITY

BACKGROUND OF THE INVENTION

1. Field of the Invention

The present invention relates generally to improved capacity of defective materials and more specifically to the preparation of defective metal oxides for battery cathodes with increased specific energy and improved lithium capacity.

2. Discussion of the Background

The revolution in the portable electronics industry has increased the demand for lightweight, high-energy batteries. Strategies for improving the energy density of batteries include technical challenges such as (1) increasing the voltage difference between the cathode and anode, (2) decreasing the weight of the materials, and (3) increasing the charge-storage capacity of the materials.

The obstacles to these improvements are often physical. For instance, the lithium (Li) capacity of metal-oxide charge-storage materials is limited because the valence of the metal cations fixes the number of electrons withdrawn from each metal center, as shown for the $V_2O_5$-cathode half-cell reaction in Eq. 1. Only one electron is consumed when a lithium ion from an electrolyte solution ($Li_{(sol)}^+$) inserts into a $V_2O_5$ cathode and a $V^{5+}$ ion is reduced to $V^{4+}$ (Eq. 1).

Using Kröger-Vink notation, $V_v$ designates a $V^{5+}$ ion at a vanadium-cation site in the $V_2O_5$ lattice, and $V_v'$ represents the occupation of the cation site with a $V^{4+}$ ion, leaving it effectively 1-negative ('). $Li_i^{\cdot}$ represents a lithium ion that is located in an interstitial site (i) and has an effective 1-positive charge ($\cdot$). The $Li^+$ may actually be associated with an oxygen anion, but this defect is electrically and site equivalent to a lithium interstitial. Kröger-Vink notation, which is used to write equilibrium reactions and mass action equations in defective oxides, is also useful for writing equations for the metal oxides used in batteries, because it demands site and charge balance in addition to chemical balance and includes defects (vacancies, etc.) as chemical species.

The vanadium cations in bulk $V_2O_5$ are reduced to an average oxidation state of +4.5 with $Li^+$ insertion, because structural constraints allow reduction of only half of the $V^{5+}$ ions to $V^{4+}$. This physical limitation of 0.5 electron stored per vanadium ion is broken when $Li^+$ is inserted into $V_2O_5$ materials synthesized by sol-gel methods. Up to 2.5 $Li^+$ can be inserted per vanadium ion into the amorphous, high surface area, high porosity frameworks of $V_2O_5$ aerogels and xerogels, resulting in capacities as high as 600 mAh/g. Although Eq. (1) predicts $V^{3+}$ defects should be formed when 3 to 5 equivalents of $Li^+$ are inserted into $V_2O_5$ xerogels and aerogels, X-ray absorption spectroscopy (XAS) studies indicate that only $V^{4+}$ and $V^{5+}$ ions are present in the fully discharged materials. Raman spectroscopy shows unique vibrational bands in Li—$V_2O_5$ xerogels, but provides no identification of the mechanism for the additional $Li^+$ insertion. Even if the metal-oxide materials become metallic, the charge balance constraints in Eq. 1 still apply.

SUMMARY OF THE INVENTION

The present invention has been made in view of the above-described problems that need to be solved, and an object of the present invention is therefore to provide a method to improve the lithium capacity of metal oxide materials. Point defects are introduced into a metal oxide to increase its lithium ion capacity.

Accordingly, it is one object of the present invention to provide a novel method for the preparation of defective metal oxides for battery cathodes with increased capacity.

It is another object of this invention to provide a method for the preparation, using a heat treatment, of defective metal oxides for battery cathodes with increased capacity.

It is another object of this invention to provide a method for the preparation, by using a chemical treatment, of defective metal oxides for battery cathodes with increased capacity.

It is another object of this invention to provide a method for the preparation of defective metal oxides for battery cathodes with increased capacity.

These and other objects, which will become apparent during the following detailed description, have been achieved by the inventors' discovery that lithium-ion capacity of metal oxides may be controlled via point defects that may be introduced into a metal oxide by:

(a) providing a metal oxide sample wherein the metal oxide sample has a specific energy;

(b) applying a gas to the metal oxide sample to increase the specific energy, wherein the gas is a mixture of $O_2$ and $H_2O_{(g)}$;

(c) heating the metal oxide sample; and (d) cooling the metal oxide sample.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a table showing a series of $V_2O_5$ samples heated under different atmospheres: capacity of 0.5 mg samples at discharge rate of 10 μA, and open-circuit potential (OCP) of the materials before cycling.

DETAILED DESCRIPTION OF THE PREFERRED EMBODIMENTS

Figure 1:
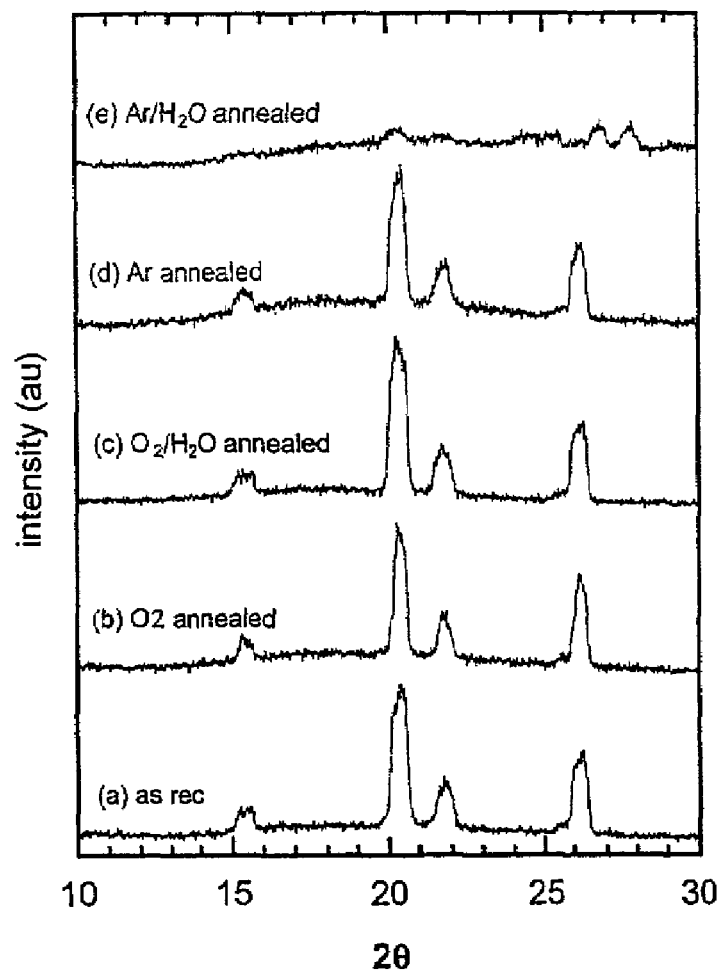
FIG. 1 is an illustration of X-ray diffraction (XRD) patterns of $V_2O_5$ samples as received and after heating under different gas mixtures. The different samples shown are (a) as received, and after heating under (b) $O_2$, (c) $O_2/H_2O$, (d) Ar, and (e) Ar/$H_2O$.

Thus, in a first embodiment, the present invention provides for (a) providing a metal oxide sample wherein the metal oxide sample has a specific energy;

(b) applying a gas to the metal oxide sample to increase the specific energy, wherein the gas is a mixture of $O_2$ and $H_2O_{(g)}$;

(c) heating the metal oxide sample; and (d) cooling the metal oxide sample.

The gas applied to the metal oxide sample can be applied at a linear flow rate of about 50-350 ccm and the heating step can be from about 2 to about 20° C./min up to about 460° C. Once the heating of 460° C. is achieved, this temperature can be maintained for about 24 hours. A second embodiment of the present invention provides for supplying a metal oxide sample wherein the metal oxide sample has a specific energy. applying a gas to the metal oxide sample to increase the specific energy, heating the metal oxide sample at a temperature of from about 300° C. to about 600° C. and maintaining this heating step from about 6 to about 72 hours and cooling the metal oxide sample at about 2 to about 20° C./min until ambient temperature is achieved. An example of the metal oxide samples include but is not limited to $V_2O_5$ and can comprise a surface area of about 1-10 square meters.

Vacancies may be introduced into the vanadium oxide ($V_2O_5$) lattice during heating under various atmospheric conditions. It is to be understood that "$V_2O_5$" describes vanadium oxide in which the vanadium is predominantly in the +5 valence state.

To examine the interaction of $Li^+$ with defects in the $V_2O_5$ lattice, commercially available, anhydrous, bulk $V_2O_5$ is made defective by conventional heat treatments under $O_2$, $O_2/H_2O$, Ar, and Ar/$H_2O$, and the treated materials are tested for changes in Li capacity relative to the as-received $V_2O_5$ powder. Although bulk $V_2O_5$ usually has lower capacity than materials synthesized from sol-gels, it is compositionally uniform and stable, and therefore an ideal standard material.

A range of defective $V_2O_5$ materials is prepared by heating commercial $V_2O_5$ powder (Alfa) under $O_2$, $O_2/H_2O$, Ar, and Ar/$H_2O$. Approximately 1 g of the as-received $V_2O_5$ powder is loaded into an alumina boat in a 1" diameter alumina tube under ~350 ccm flowing $O_2$, $O_2/H_2O$, Ar, or Ar/$H_2O$ and heated at 5° C./min to 460° C. After holding at 460° C. for 24 h, the samples are cooled at 5° C./min to room temperature and then stored in sealed vials under ambient air.

The structure of the $V_2O_5$ samples is determined via XRD (Rigaku Rotoflex, Cu rotating anode, 50 kV and 150 mA). Powder samples are mounted with double-stick tape on glass slides. Electrodes are prepared by vigorously mixing the $V_2O_5$ with 13 wt % acetylene black (Alfa), 9 wt % polyvinylidene fluoride (PVDF, Elf Atochem) in an excess of either 2-methyl pentanone (Aldrich) at 60° C. or hexanes (Aldrich) at room temperature. The suspension is added dropwise to a strip of clean Pt foil and heated on a hot plate to remove excess solvent. The amount of material on the foil (0.5 to 1.5 mg) is then adjusted so that the $V_2O_5$ weight in all samples is within ±2%. After vacuum drying at >150° C. for 12 to 24 h, the electrodes are loaded into an Ar-filled glove box. The $V_2O_5$/Pt electrodes are tested in a solution of 1 M Li-perchlorate (Aldrich) in distilled propylene carbonate (Aldrich) vs Li metal auxiliary and reference electrodes (Aldrich). The electrodes are charged and discharged between 2 and 4 V vs Li using a potentiostat (PAR 263; M270 software) in galvanostatic mode. The open-circuit potential (OCP) of each electrode is measured after equilibrating for at least 10 min in the Li-propylene carbonate electrolyte. The samples are first charged to 4 V to displace residual protons before discharging to 2 V. Acetylene black and platinum electrodes with no $V_2O_5$ have negligible capacity when charged and discharged between 2 and 4 V.

X-ray diffraction shows that the as-received, orange-colored $V_2O_5$ is crystalline and has the Shcherbinaite structure (ICCD PDF Card # 41-1426). The same phase is measured for the samples heated at 460° C. under $O_2$, $O_2/H_2O$, and Ar (FIG. 1), indicating that the long-range structure of the $V_2O_5$ is not affected by these temperature/atmosphere/time conditions and suggesting that ionic defects have been introduced. All of these samples are also orange-colored after reacting under heat. The XRD pattern of the green-black Ar/$H_2O$-heated $V_2O_5$ indicates that it is highly disordered to amorphous and has only a trace of the Shcherbinaite structure. Additional peaks are measured in the Ar/$H_2O$-heated $V_2O_5$ but these diffraction peaks cannot be matched to a single vanadium-oxide or hydrous vanadium-oxide phase.

Figure 2:
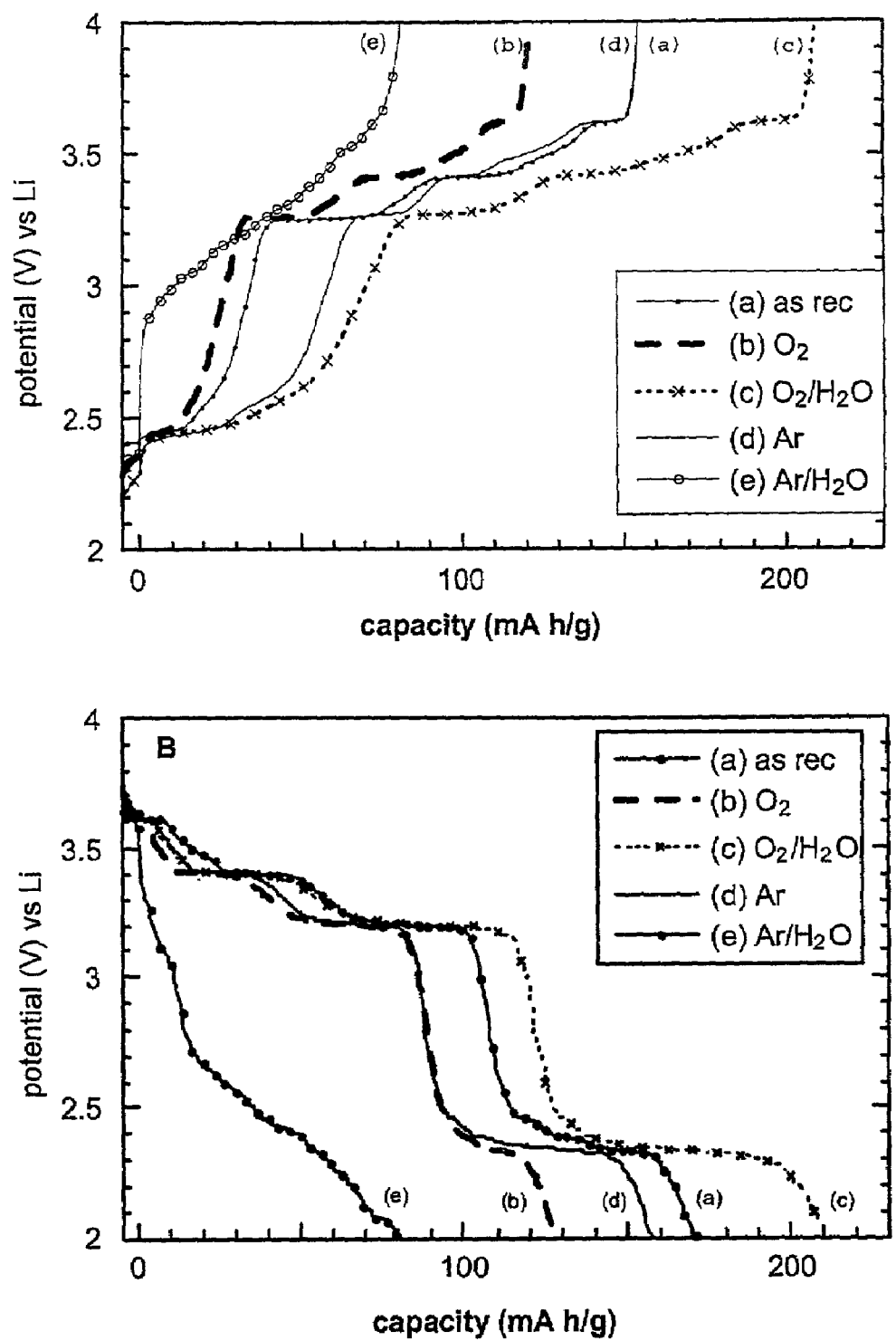
FIG. 2 is an illustration of charge-discharge profiles of 0.5 mg $V_2O_5$ electrodes after treatment by heating under different atmospheres (A) first complete charging cycle (10 μA), (B) first complete discharge cycle (10 μA).

The Li capacity of $V_2O_5$ powder is significantly affected by the heating conditions. FIG. 2 shows a series of electrodes that contain 0.5 mg of $V_2O_5$ that are charged and discharged at 10 μA (20 μA/mg); the Li capacity results are summarized in Table I. Under these charging and discharging conditions, the capacity of the Ar/$H_2O$-heated $V_2O_5$ is 72 mA·h/g (±4%), which is almost 58% lower than the capacity of the as-received $V_2O_5$ (172 mA·h/g). The capacity of the $O_2/H_2O$-heated $V_2O_5$ is 212 mA·h/g, or 22% greater than the capacity of the as-received $V_2O_5$. The capacities of the Ar-heated and $O_2$-heated $V_2O_5$ are 8% and 25% lower than that of the as-received $V_2O_5$, respectively. The profiles of the charge and discharge curves are identical for the samples heated under $O_2$, $O_2/H_2O$, and Ar versus the as-received $V_2O_5$, however the time (or capacity) of each charge and discharge potential step varies.

The values measured for the Li capacities vary between different batches of electrodes probably due to variations in the sample weights (or electrode thicknesses) and drying conditions. However, the same trends are observed. Also, the differences in the capacities of the $V_2O_5$ materials are lessened as they are discharged at higher rates (up to 100 μA/mg). The capacity of all of the $V_2O_5$ powders fades by 1 to 3% after each cycle. The acetylene black and platinum make negligible contributions to the results.

In comparison to the as-received $V_2O_5$, the OCPs of the $O_2$— and Ar-heated $V_2O_5$ are ~65 mV higher, the $O_2/H_2O$-heated $V_2O_5$ is 50 mV higher, and the Ar/$H_2O$-heated material is only ~5 mV higher. The OCP values vary between electrode batches, but the trend remains the same.

Heating bulk $V_2O_5$ under $O_2$, $O_2/H_2O$, and Ar causes no change to the long-range structure of the metal oxide, but it significantly affects the $V_2O_5$ lithium capacity. Under the $O_2$, Ar, and Ar/$H_2O$ heating steps, the Li capacity is decreased. The lithium capacity is increased for the samples heated under $O_2/H_2O$. Since the long-range structure does not change, this suggests that local ionic defects introduced by the $O_2/H_2O$ heat treatment, such as cation vacancies, are affecting the lithium capacity of the metal oxide.

The $V_2O_5$ that is heated under Ar/$H_2O$ has ~60% decrease in Li capacity versus the as-received material, but it also undergoes a phase transformation to a highly disordered, hydrous structure during temperature/atmosphere treatment. These results support the supposition that the high Li capacity of $V_2O_5$ materials prepared by sol-gel methods is not just due to their hydrous, highly disordered structure, but rather to another effect such as ionic defects.

The change in the OCPs of the heated $V_2O_5$ materials indicates that they are thermodynamically different from the as-received material. It is suggested that other metal oxides behave similarly with $O_2/H_2O$ heating. Examples of metal oxides include vanadium oxide, manganese oxide, nickel oxide, cobalt oxide, and iron oxide. The metal oxide can be in its stoichiometric or non-stoichiometric form. The metal oxide can be doped with a transition metal. Additionally, the lithiated form of the metal oxide can be used.

Hydrogen ions (i.e., protons and hydride ions) usually behave similarly to lithium ions. This approach is applicable to other battery systems using metal oxides, such as alkaline and metal hydride batteries.

We claim:

1. A process for preparing a defective metal oxide for a battery cathode with increased lithium capacity, said process comprising:
   providing a sufficient amount of metal oxide;
   heating said metal oxide under an atmosphere consisting essentially of $O_2$ and $H_2O_{(g)}$ gas wherein said heating step is maintained at a temperature of from about 300 to about 600° C.; and
   cooling said metal oxide, wherein said heating under said atmosphere introduces local ionic defects and increases the lithium capacity of said metal oxide.

2. The process as in claim 1, wherein said heating is maintained from about 6 to about 72 hours.

3. The process as in claim 1, wherein said $O_2$ and $H_2O_{(g)}$ is applied to said metal oxide sample at a linear flow rate of about 50 ccm to about 350 ccm.

4. The process as in claim 1, wherein said heating is from about 2 to about 20° C./min up to about 460° C.

5. The process as in claim 4, further comprising the step of:
   maintaining said temperature of about 460° C. for 24 hours.

6. The process as in claim 1, wherein said cooling is from about 2 to about 20° C./min until ambient air temperature is achieved.

7. The process as in claim 1, wherein said metal oxide is $V_2O_5$.

8. The process as in claim 1, wherein said metal oxide comprises a surface area of about 1-10 square meters.

9. A process for preparing a defective metal oxide for a battery cathode with increased lithium capacity, said process comprising:
   providing a sufficient amount of metal oxide;
   heating said metal oxide at a temperature of from about 300 to about 600° C. for a time period of from about 6 to about 72 hours under an atmosphere consisting essentially of $O_2$ and $H_2O_{(g)}$ gas, wherein said $O_2$ and $H_2O_{(g)}$ is applied to said metal oxide sample at a linear flow rate of about 50 ccm to about 350 ccm; and
   cooling said metal oxide, wherein said heating under said atmosphere introduces local ionic defects and increases the lithium capacity of said metal oxide.

* * * * *